3,034,961
α-PHENYL-ORTHOMETHOXY CINNAMIC ACID CHOLERETIC PROCESS AND PHARMACEUTICAL DOSAGE COMPOSITION

Marcel Pesson, Paris, and Julien Salle, Ste.-Genevieve-des-Bois, France, assignors to Roger Bellon, Neuilly-sur-Seine, France
No Drawing. Filed Apr. 13, 1959, Ser. No. 805,706
Claims priority, application Great Britain Apr. 22, 1958
6 Claims. (Cl. 167—65)

This invention relates to a pharmaceutical composition having choleretic activity, i.e. increasing bile secretion.

Certain derivatives of cinnamic acid are known to have the property of increasing biliary secretion. One such derivative is dihydroxy-3,4-cinnamic acid (also called caffeic acid), and forming one constituent of cynarine. Another choleretic compound more potent than caffeic acid is methoxy-3-hydroxy-4-cinnamic acid (or ferulic acid). This has led to the belief that the presence of an acryl chain tended to increase choleretic activity, since cinnamic acid per se is substantially inactive in this respect.

The applicant has conducted systematic investigations to ascertain the actual relationship between chemical structure and choleretic activity of cinnamic derivatives. For this purpose various molecular groups and elements were substituted at predetermined positions, in the nucleus, and on the α carbon of the ethylene linkage. The result of his research is, that very high choleretic activity is displayed by those compounds having the general formula

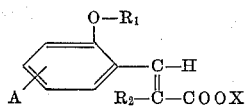

where:

$R_1$ is an alkyl radical,
$R_2$ is either a hydrogen atom, a substituted aryl radical, or an unsubstituted aryl radical,
X is a hydrogen atom, a monovalent metal or a monovalent fraction of a polyvalent metal, and
A is a halogen or a hydrogen atom.

The present invention accordingly is directed to pharmaceutical compositions containing at least compounds of the above general formula, as an ingredient therein.

The alkyl radical $R_1$ may advantageously be a methyl radical. In such case there are two compounds according to the invention which are of particular interest. One is that wherein A is a halogen and $R_2$ a hydrogen atom, and the other is that where A is a hydrogen atom and $R_2$ an unsubstituted phenyl radical.

A pharmaceutical composition according to the invention may contain, in addition to one or more of the above defined compounds, any suitable ingredients such as laxative, spasmolytic, cholegogic and choleretic substances.

Compounds according to the invention can be applied in any of various pharmaceutical forms, such as cachets, capsules wherein the compound of the invention may be in any desired proportion from 1% to 100%; and tablets which may or may not be coated with suitable compositions, with the active compound preferably in an amount of from 1 to 90%, or again granules, with the active proportion being in a preferred range from 0.1 to 25%.

Alternatively, the compounds of the invention may be embodied in syrups as soluble salts, at concentrations of from 1 to 25%; suspensions wherein the active compound may be contained as a low-solubility salt or acid in a proportion of from 5 to 25%; emulsions with the active ingredient present as a salt dissolved in the aqueous phase in a proportion of from 5 to 25%; suppositories with the active ingredient present as a salt in a proportion of from 1 to 25%; and aqueous solutions for intubation containing the active compound as a soluble salt at a concentration of from 5 to 25%. It will be understood that the above indicated proportions are illustrative rather than restrictive, nor is the listing of possible forms in which the drug may be applied exhaustive.

The technique used in the above mentioned investigation for determining the relative choleretic potency of the various substances tested will be outlined. The test animal was the guinea pig, whose normal rate of bile secretion is about 0.40 to 0.65 cc./10 minutes, a value high enough to permit of convenient and accurate relative measurements.

The various compounds tested were applied the introduodenal way, using the following surgical technique. The animal was anesthesized with ethylurethane and was then incised medially in the sub-sternal region. The duodenum was withdrawn from the body cavity and the choledoch duct was isolated, then mounted on a light probe and bound near the duodenum. A small incision was made in the duct and a thin-walled polyethylene tube with a bevel end was inserted into the duct and made secure therein. This tube allowed the tested substance to be directly introduced into the initial portion of the small intestine. The cavity wall was then closed by means of a few stitches and the tube through which the bile was discharged was secured to prevent displacement of it during experiment. The tested compounds were sodic salts in water solution and were applied in 100 mg. doses.

The bile was collected in a 1 cc. capacity syringe and the volumes collected were measured at ten-minute intervals. All the test animals had fasted at least 6 hours to ensure a regular rate of bile discharge. From the volume of bile secreted the basic bile rate or choleretic was determined as the average value taken over 4 or 5 different values.

In evaluating the potency of a choleretic drug, it is important to determine both the increase (or decrease) of the rate of bile discharge, and the time during which such increase (or decrease) obtains, i.e. the drug's time of action. The reliability of the drug, defined as the percentage of positive tests in which the drug was found to exert a definite action on a choleresis, to the total number of tests made with the drug, is also a factor requiring consideration.

In order to take the various above parameters into account, the potency of a tested drug was defined as the product $$N = A \times B \times C$$

where A is the percentage of increase in basic choleresis, i.e.

$$A = \frac{\text{Average choleresis} - \text{basic choleresis}}{\text{Basic choleresis}} \times 100$$

average choleresis being defined as the mean value of bile secretion over the total time of action of the drug, and basic choleresis as the mean value of secretion over 4 or 5 measurements in the absence of the drug, as previously mentioned;

B is the time of action or persistency, i.e. the time during which the rate of secretion remains higher than the basic value, expressed in hours, and decimal fractions of an hour; and C is the reliability coefficient. To determine this each drug was tested on 10 to 12 animals, and C is expressed as a coefficient which assumes a value of unity if all the animals have shown a positive response.

The test results obtained with various cinnamic compounds are summarized below.

Of the three methoxycinnamic acids, methoxy-2-cinnamic acid has the most definite activity; though this is low in the transform, the cis isomer of the acid is very active, with N=152, i.e. twice the value for ferulic acid (N=72).

Replacement of the methoxyl with a longer chain does not increase the activity as indicated by the following table:

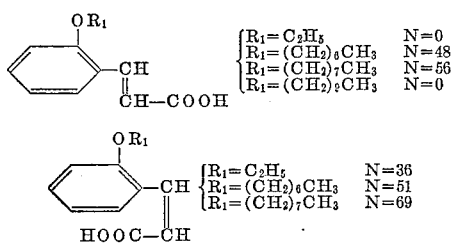

Neither does substitution of an aliphatic chain on the α-carbon increase choleretic activity.

Introduction of a bromine atom of the methoxy-2-cinnamic acid has considerable influence. When introduced in the trans form in position 5, activity is substantially increased (N=197), whereas it is reduced when the bromine is added in the same position in the cis form (N=49).

α-Phenylcinnamic acid is slightly active, N=36. Substitution of a methoxyl group on the aromatic nucleus of the cinnamic molecule only yields a compound having desirable activity when effected in position 2.

α-Phenylorthomethoxycinnamic acid in trans form has an extremely high activity, N=236. In the cis form its activity is much lower, N=79.

Various substitutions made in the nucleus of the cinnamic fraction of the latter acid did not improve the activity of the resulting compounds as shown by the following table:

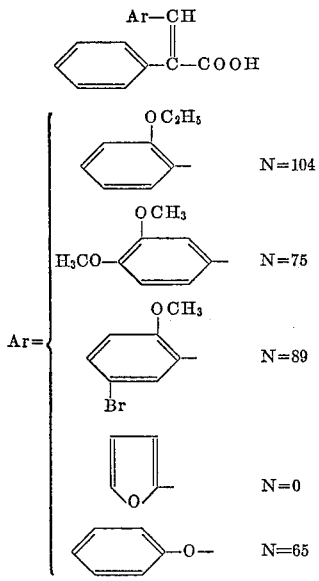

In these compouds the benzene nucleus in α position is indispensable for positive activity. Thus, cyclohexenic derivatives are less active. On the other hand replacement of the methoxy group at 2 position in this nucleus does not exert as beneficial an influence as when effected on the other nucleus, since then N=95.

The compound α-phenylorthomethoxycinnamic acid, which as indicated above was found to be particularly potent (N=236) will now be briefly described from a pharmacodynamic point of view.

The choleretic activity of this compound was demonstrated on all the animal species tested except the rabbit. In the guinea pig its activity is the same whether applied venously or orally. With the rat its activity is approximately the same. With the dog its action still remains substantially high three hours after intravenous injection at a dose of 10 mg./kg. With the cat similar results are observed. In all of the tested animals, both in experiments of the acute and the chronic type, an increase is observed in the total elimination of the chief constituents in the bile.

Acute and chronic toxicity of the compound was investigated. The acute toxicity test showed that hypodermically the $DL_{50}$ value for the sodium salt is 0.440 g./kg. for the mouse. Intraperitoneally, $DL_{50}$ is 0.400 g./kg. for the mouse. Orally $DL_{50}=1.25$ g./kg. for the mouse, 1.30 g./kg. for the rat and 1 g./kg. for the guinea pig.

Chronic toxicity was investigated with a batch of young rats, which were each treated every day for two months through a gastric probe with a sodium salt of the compound, at a daily dose of 100 mg./kg., or about $\frac{1}{10}$ of the $DL_{50}$.

The growth curve of these animals was identical to that of a batch of control rats. The blood composition remained normal throughout the experiment. No anomaly was detected in the main organs of the animals slaughtered at the end of the experiment.

The compound exerts no harmful action on the hepatic cells. Application of the compound in no case slows down elimination of tetrabromosulfonephthalein from the liver in the animals subjected to subchronic poisoning. The test remains satisfactory even at the end of 7 days. This demonstrates the absolute harmlessness of the drug to hepatic tissue.

The drug appears to be chiefly eliminated with the urine in the form of glycuro-conjugate.

No excitant or sedative action was observed. In a dose of 15 mg./kg. venously, a slight respiratory analeptic action is believed to be present. At very high doses of about 100 mg./kg. and in intravenous injection in the dog, it sometimes causes a very slight and fleeting lowering of the blood pressure. However, no action on the electrocardiogram was observed.

Some toxicity tests were also made with the compound of the invention wherein $R_1$ is $CH_3$, $R_2$ is H and A is Br. The compound was applied hypodermically to the mouse in the form of the sodium salt. The $DL_{50}$ was found to be 0.460 g./kg.

Finally, α-phenylorthomethoxycinnamic acid was subjected to clinical tests including both duodenal tubing, and treatment with cachets and tablets containing the drug, of human subjects suffering from functional deficiency of the liver.

Application of the substance at a dose of 1 gram through duodenal tubing in the form of a water solution of the sodic salt, showed better results than those obtained with magnesia sulphate applied in the same way at doses 6 times higher. Results relating to concentration in the bile and elimination of biliary salts are given in the following tables which indicate average figures obtained with the treated subjects:

|  | Before | After | Percent Relative Increases |
|---|---|---|---|
| Influence on concentration: |  |  |  |
| Biliary salts (g./1,000) | 3.21 | 5.17 | 60 |
| Biliary pigments (g./1,000) | 0.20 | 0.37 | 86 |
| Cholesterol (g./1,000) | 0.31 | 0.56 | 80 |
| Influence on elimination: |  |  |  |
| Biliary salts (Mg. in 20 min.) | 849 | 2857 | 236 |
| Pigments | 43.5 | 140 | 226 |
| Cholesterol | 64.2 | 261.4 | 308 |

Many series of clinical tests were conducted. One especially important investigation related to 40 subjects 10 of which were normal, while the other 30 were subject to definitely diagnosed syndromes including biliary dyskinesis, hemicrania, cholecystitis, cirrhosis and/or cirrhogenous hepatitis. The posology used was from 0.50 to 1 gram per day.

Tolerance was excellent including the particularly sensitive individuals subject to hemicrania. The over-all clinical results can be stated as follows:

Highly favourable action in 60% of the cases, with conclusive improvements of functional disorders; favourable, though less extensive results in 30% of the cases.

One particularly interesting case was that of a female subject carrying a Kehr drain. This made it possible to confirm the choleretic activity of the drug, which was manifested as an increase not only in the rate of bile secretion but also in the concentration of bilirubine, chloresterol and biliary salts in the bile.

Other tests involved boys of from 7 to 11 years old to whom the drug was given for 10 to 15 days in doses of from 0.08 to 0.15 gram per day. In 80% of the cases symptoms such as a suburral condition of the digestive tract, constipation, hemicrania, disappeared as early as the fifth day of treatment.

50% of the children were revisited 2 months after the treatment and the improvement was found to have persisted.

We claim:

1. Method of producing choleresis which comprises administering to a subject a compound having the formula

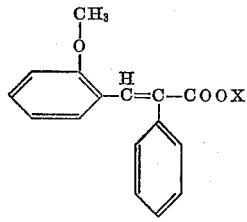

wherein X is a member of the group consisting of hydrogen and a pharmaceutically acceptable monovalent cation selected from the group consisting of monovalent and polyvalent metals.

2. Method of producing choleresis which comprises administering to a subject α-phenyl-orthomethoxy cinnamic acid.

3. Method of producing choleresis which comprises administering to a subject the sodium salt of α-phenyl-orthomethoxy cinnamic acid.

4. Method of producing choleresis which comprises administering to a subject the trans form sodium salt of α-phenyl-orthormethoxy cinnamic acid.

5. A composition for producing choleresis which comprises a compound having the formula

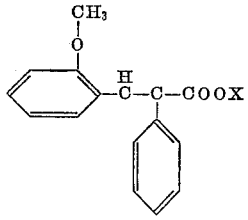

wherein X is a member of the group consisting of hydrogen and a pharmaceutically acceptable monovalent cation selected from the group consisting of monovalent and polyvalent metals, and a pharmaceutical carrier, said composition being in form to provide for a dosage of the compound of about 0.5 to 1.5 gram per day.

6. A composition in accordance with claim 5 wherein the compound is in the trans form.

References Cited in the file of this patent
UNITED STATES PATENTS 2,691,039    Linsert et al. _____ Oct. 5, 1954